UNITED STATES PATENT OFFICE.

ADOLPH SPIEGEL, OF HÖCHST-ON-THE-MAIN, GERMANY, ASSIGNOR TO FARB-WERKE, VORMALS MEISTER, LUCIUS & BRÜNING, OF SAME PLACE.

AZO COLORING-MATTER.

SPECIFICATION forming part of Letters Patent No. 303,335, dated August 12, 1884.

Application filed January 10, 1884. (Specimens.)

*To all whom it may concern:*

Be it known that I, ADOLPH SPIEGEL, doctor of philosophy, a citizen of the Empire of Germany, residing at Höchst-on-the-Main, in the Empire of Germany, have invented certain new and useful Improvements in the Manufacture of Coloring-Matter, of which the following is a specification.

My invention relates to the manufacture of a coloring-matter soluble in water from an azo coloring-matter insoluble in water, but soluble in spirit.

In carrying out my invention I first prepare the azo coloring-matter dichlorphenol-azo-ethyl-beta-naphthol of the formula—

$$C_6H_2 \left\{ \begin{array}{l} OH \\ Cl_2 \\ N \end{array} \right\} =N-C_{10}H_5-C_2H_5.$$

To prepare this compound I take the body known as "ortho-amido-dichlorphenol," which may have been prepared in various ways—as, for instance, by reducing the ortho-nitro-dichlorphenol of F. Fischer, (Zeitschrift für Chemic., 1868, p. 386.) The amido-dichlorphenol is diazotized in the well-known manner, and the diazo-dichlorphenol of Schmidt and Glutz, (Berichte der Deutschen, Chem. Ges. II, p. 52,)—a yellowish-brown body of the formula 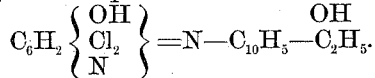 =N—is obtained. The diazo-dichlorphenol is combined with a molecular quantity of ethyl-beta-naphthol, according to the method well known to chemists, thereby producing the scarlet azo coloring-matter dichlorphenol-azo-ethyl-beta-naphthol.

In order to convert the azo coloring-matter just defined into the new coloring-matter soluble in water, I take, say, fourteen pounds in the form of a paste or fine powder, and thereunto add, say, one hundred-weight of spirits of wine, along with, say, twenty-eight pounds of a concentrated solution of the bisulphite of an alkali. The mixture is now, in a closed vessel, or in one supplied with a reversed cooler, heated upon the water bath until the scarlet crystals of the said compound have made room for the orange-colored crystals of the bisulphite compound, which will be the case after two hours, care having been taken to stir well. The alcohol is now distilled off, and the residual crystalline mass is allowed to cool. The crystals are separated from the suspending-liquid by filtration, and now represent the bisulphite compound sought, ready for use in the form of a powder or paste.

The bisulphite compound thus obtained possesses the following characteristics: It is soluble in water with a yellow color. When an alkali is added to this yellow solution, or when it is boiled with a nitrite, this coloring-matter being a bisulphite compound, is easily decomposed, and the bluish-violet salt of the compound mentioned in the first part of this specification is precipitated.

Having thus described my invention, what I claim as new, and desire to secure by Letters Patent, is—

The new coloring-matter, substantially as herein described, it being the bisulphite compound of dichlorphenol-azo-ethyl-beta-naphthol, the same being soluble in hot water with a yellow color, and when an alkali is added to this yellow solution, or when it is boiled with a nitrate, it is decomposed easily and a bluish-violet salt of the azo coloring-matter is precipitated.

In testimony whereof I affix my signature in presence of two witnesses.

ADOLPH SPIEGEL.

Witnesses:
F. VOGELER,
J. GRUND.